(12) United States Patent
Marshall et al.

(10) Patent No.: US 11,649,733 B1
(45) Date of Patent: May 16, 2023

(54) FLEXIBLE SEAL ASSEMBLY

(71) Applicant: Technetics Group LLC, Charlotte, NC (US)

(72) Inventors: Dave Marshall, Boylston, MA (US); Michael P. Cenedella, Webster, MA (US); Mark Whitlow, Columbia, SC (US); Bob Schricker, Charlotte, NC (US); Caleb Garrison, Charlotte, NC (US)

(73) Assignee: Technetics Group LLC, Charlotte, NC (US)

( * ) Notice: Subject to any disclaimer, the term of this patent is extended or adjusted under 35 U.S.C. 154(b) by 244 days.

(21) Appl. No.: 17/145,559

(22) Filed: Jan. 11, 2021

Related U.S. Application Data

(62) Division of application No. 16/005,044, filed on Jun. 11, 2018, now Pat. No. 10,890,078.

(60) Provisional application No. 62/518,487, filed on Jun. 12, 2017.

(51) Int. Cl.
| | |
|---|---|
| *F01D 11/00* | (2006.01) |
| *F16J 15/02* | (2006.01) |
| *F16J 15/08* | (2006.01) |
| *F16J 15/12* | (2006.01) |

(52) U.S. Cl.
CPC ......... *F01D 11/005* (2013.01); *F16J 15/022* (2013.01); *F16J 15/0806* (2013.01); *F05D 2240/55* (2013.01); *F16J 15/0887* (2013.01); *F16J 15/126* (2013.01)

(58) Field of Classification Search
CPC ..... F01D 11/005; F01D 9/023; F16J 15/0812; F16J 15/0887; F05D 2240/11; F05D 2240/55; F05D 2240/57; F02C 7/28
See application file for complete search history.

(56) References Cited

U.S. PATENT DOCUMENTS

| | | | |
|---|---|---|---|
| 4,645,217 A | 2/1987 | Honeycutt, Jr. et al. | |
| 5,934,687 A | 8/1999 | Bagepalli et al. | |
| 5,997,247 A | 12/1999 | Arraitz et al. | |
| 6,312,218 B1* | 11/2001 | Beeck | F01D 11/005 |
| | | | 416/193 A |
| 7,334,800 B2* | 2/2008 | Minnich | F01D 11/005 |
| | | | 277/654 |
| 7,360,769 B2 | 4/2008 | Bennett | |
| 8,123,232 B2 | 2/2012 | Fujimoto et al. | |

(Continued)

*Primary Examiner* — Nicholas L Foster
(74) *Attorney, Agent, or Firm* — Perkins Coie LLP

(57) ABSTRACT

Flexible seal assemblies having a relatively low torsional rigidity and high longitudinal flexure to thereby allow the flexible seal assembly to flex between adjacent components and maintain a seal, even when movement between adjacent components occurs, is described. In some embodiments, the flexible seal assembly includes one or more layers of metal matrix material, the metal matrix material being comprised of a plurality of short segments of thin wire arranged randomly and sintered together to form a semi-rigid sheet. The one or more layers of metal matrix material can be sandwiched between an upper casing and a lower casing of a metal alloy casing. In various embodiments, additional features are provided for helping to make sure the seal assembly stays together, such as spot welds formed through the seal assembly, an S-shaped casing, and a recess/protrusion feature provided on adjacent layers of metal matrix material.

11 Claims, 14 Drawing Sheets

(56) References Cited

U.S. PATENT DOCUMENTS

| | | | |
|---|---|---|---|
| 8,678,754 B2 | 3/2014 | Morgan et al. | |
| 9,188,228 B2 | 11/2015 | Sarawate et al. | |
| 9,938,844 B2 | 4/2018 | Morgan et al. | |
| 9,945,484 B2 * | 4/2018 | Moehrle | F01D 11/003 |
| 10,047,622 B2 | 8/2018 | Sarawate et al. | |
| 10,100,656 B2 | 10/2018 | Bancheri et al. | |
| 10,161,523 B2 | 12/2018 | Sarawate et al. | |
| 10,890,078 B1 | 1/2021 | Marshall et al. | |
| 2002/0121744 A1 | 9/2002 | Aksit et al. | |
| 2003/0039542 A1 | 2/2003 | Cromer | |
| 2006/0091617 A1 | 5/2006 | Minnich | |
| 2007/0158919 A1 | 7/2007 | Bennett | |
| 2009/0026713 A1 | 1/2009 | Fujimoto et al. | |
| 2012/0133102 A1 * | 5/2012 | Samudrala | F16J 15/104 277/654 |
| 2012/0164429 A1 | 6/2012 | Shah et al. | |
| 2012/0292862 A1 * | 11/2012 | Moehrle | F01D 11/005 277/654 |
| 2013/0106066 A1 | 5/2013 | Sarawate et al. | |
| 2013/0108418 A1 | 5/2013 | Morgan et al. | |
| 2013/0134678 A1 | 5/2013 | Sarawate et al. | |
| 2016/0215643 A1 | 7/2016 | Sarawate et al. | |
| 2017/0058686 A1 | 3/2017 | Bancheri et al. | |

\* cited by examiner

FLEXIBLE SEAL ASSEMBLY

CROSS-REFERENCE TO RELATED APPLICATIONS

The present application is a divisional of U.S. patent application Ser. No. 16/005,044, filed Jun. 11, 2018, which claims priority to U.S. Provisional Application No. 62/518,487, filed Jun. 12, 2017, the entirety of which is hereby incorporated by reference.

TECHNICAL FIELD

The present application relates to flexible seal assemblies, and more specifically, flexible seal assemblies having a relatively low torsional rigidity and high longitudinal flexure to thereby allow the flexible seal assembly to flex between adjacent components and maintain a seal, even when movement between adjacent components occurs.

BACKGROUND

In many industrial applications, such as gas turbines and aerospace turbines, several components are assembled together in a circular and/or segmented fashion. These arrangements typically result in the creation of gaps between adjacent segments. Such gaps are generally undesirable, as they create paths for air and gas leaks that, if not filled or closed, decrease operation efficiency.

Historically, these gaps have been filled using cloth seals or laminate seals. However, both solutions provide limitations in one or more of flexure, durability, sealing, and temperature resistance. For example, problems associated with previously known seals used to fill gaps between adjacent components include leakage along the longitudinal axis, lack of durability (e.g., brittleness), increased number of potential leak paths, wear issues, lack of compliancy, and limited resiliency.

Accordingly, a need exists for improved sealing assemblies that reduce or eliminate some or all of these limitations.

SUMMARY

This Summary is provided to introduce a selection of concepts in a simplified form that are further described below in the Detailed Description. This Summary, and the foregoing Background, is not intended to identify key aspects or essential steps of the claimed subject matter. Moreover, this Summary is not intended for use as an aid in determining the scope of the claimed subject matter.

Described herein are various embodiments of a flexible seal assembly suitable for use in applications such as gas turbines or aerospace turbines where a flat seal between adjacent components is required in order to improve operating efficiency. In some embodiments, the flexible seal assembly comprises one or more layers of a metal matrix sheet material, and a metal casing fully or partially encapsulating the one or more layers of the metal matrix sheet material. The metal matrix sheet material can be made from a plurality of segments of thin wire arranged in a random fashion to create a sheet structure, and which are then sintered together to form a semi-rigid sheet. The metal casing can be made of a metal alloy.

This composite structure provides a flexible seal assembly that has a relatively low torsional rigidity and high longitudinal flexure to thereby allow the flexible seal assembly to flex between adjacent components and maintain a seal, even when movement between adjacent components occurs. The low torsional rigidity/high longitudinal flexure also reduces wear to the components that come into contact with the seal assembly that can be caused by previously known rigid seal assemblies. Additionally, the casing protects the interior metal matrix sheet material to thereby improve the operational lifetime of the seal assembly, but without sacrificing the flexibility of the seal assembly.

BRIEF DESCRIPTION OF THE DRAWINGS

Non-limiting and non-exhaustive embodiments of the disclosed flexible sealing assembly, including the preferred embodiment, are described with reference to the following figures, wherein like reference numerals refer to like parts throughout the various views, uncles otherwise specified.

DETAILED DESCRIPTION

Embodiments are described herein more fully below with reference to the accompanying Figures, which form a part hereof and show, by way of illustration, specific exemplary embodiments. These embodiments are disclosed in sufficient detail to enable those skilled in the art to practice the invention. However, the embodiments may be implemented in many different forms and should not be construed as being limited to the embodiments set forth herein. The following Detailed Description is, therefore, not to be taken in a limiting sense.

Figure 1A:
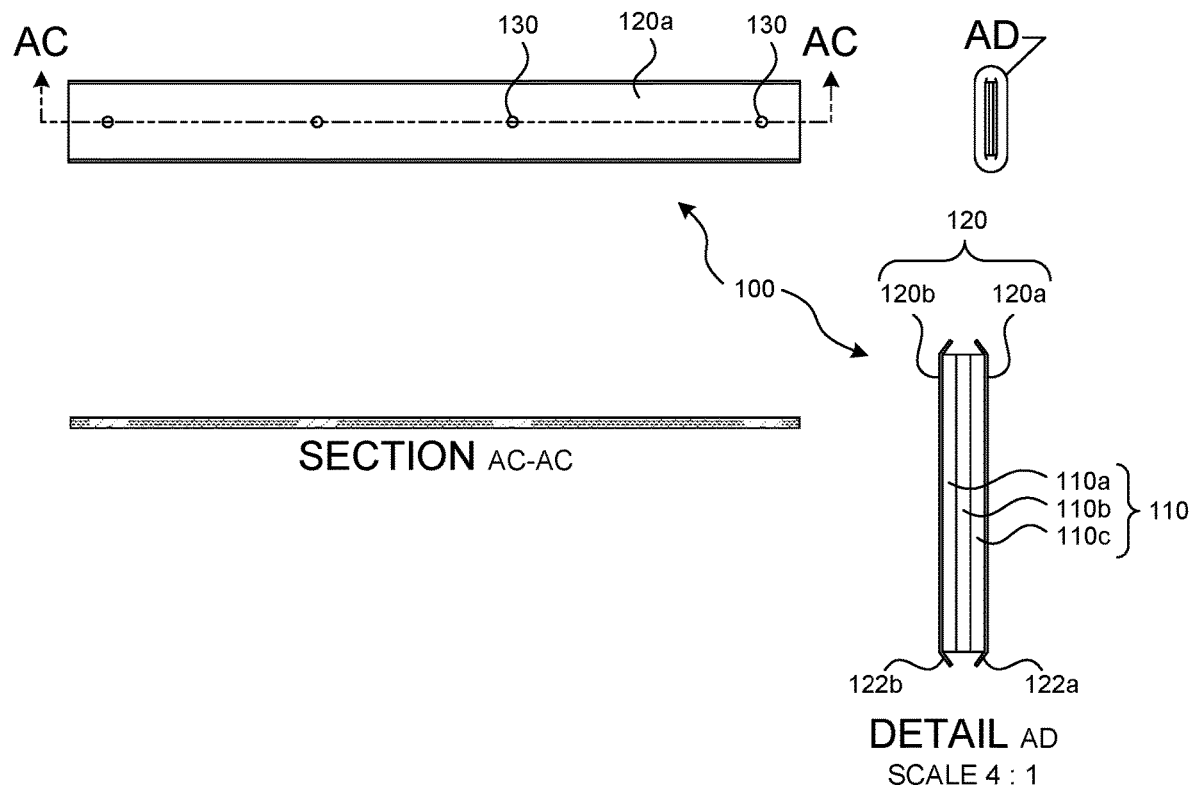
FIGS. 1A and 1B illustrate top, cross-sectional, and side views of two versions of a multi-layered flexible seal assembly according to various embodiments described herein.

With reference to FIG. 1A, a flexible seal assembly 100 according to various embodiments described herein is illustrated. The flexible seal assembly 100 of FIG. 1A includes three layers of metal matrix sheet material 110a, 110b, 110c stacked one on top of the other and sandwiched between a metal casing 120, which includes an upper metal casing 120a and a lower metal casing 120b. The layers of metal matrix sheet material 110a, 110b, 110c can have the same dimensions and shape such that edges of the layers of metal matrix sheet material 110a, 110b, 110c can be aligned when stacked together. The metal casing 120 provides a protective barrier on the top and bottom of the three layers of metal matrix sheet material 110a, 110b, 110c, while the ends of the layers of metal matrix sheet material 110a, 110b, 110c are left exposed (see, e.g., Detail AD, which is an end view of the seal assembly 100). The sides of the layers of metal matrix sheet material 110a, 110b, 110c are also exposed (see, e.g., Detail AD), but the upper metal casing 120a and the bottom 120b do each include slanted overhangs 122a, 122b that partially protect the sides of the layers of metal matrix sheet material 110a, 110b, 110c.

Each metal matrix sheet material layer 110*a*, 110*b*, 110*c* is generally comprised of multiple segments of thin wire arranged at random and sintered together to form a semi-rigid sheet material. The material of the thin wire used to create the shorter segments can generally be any suitable type of metal material and will typically have a diameter of less than 0.010 inches. The thin wire is cut into short segments, such as segments having an aspect ratio of around 20. For example, when the diameter of the thin wire is 0.010 inches, the length of the individual segments cut from the wire is typically in the range of 0.200 inches.

The thickness of a layer of the metal matrix sheet material is generally not limited, and may be as thin as approximately the two times the diameter of the wire segments used. The thickness of the metal matrix sheet material can be increased by using more segments piled on top of each other when the segments are randomly arranged to form the sheet structure.

The randomly arranged segments are sintered in order to bond together segments that contact one another. Sintering is generally carried out by using a heat-treating process. Any temperature can be used for the sintering step provided that the temperature is sufficient to bond together the metal segments without destroying the structural integrity of the wires. Similarly, the sintering can be carried out for any period of time provided that the bonding together of metal segments occurs. Other processing steps can also be used in the creation of the sheets, such as additional sintering steps and/or calendaring steps. Such additional processing steps can be used to achieve, for example, desired density, tensile strength, thickness and permeability.

The overall dimensions (x, y and z directions) of the metal matrix sheet material are generally not limited and may be selected based on the specific application in which the seal assembly will be used. In some embodiments, 3 feet by 3 feet sheets of metal matrix sheet material are prepared (with any suitable thickness), and smaller sections are cut from the larger sheets in order to provide the layers of metal matrix sheet material used in the seal assembly.

The upper casing 120*a* and the lower casing 120*b* of the casing 120 are generally formed of any suitable metal alloy. Metal alloys are suitable for use because they do not overly restrict the flexibility of the seal assembly while still providing sufficient protection to the metal matrix material layers 110*a*, 110*b*, 110*c*. As discussed above, the sealing assembly 100 shown in FIG. 1A provides an upper protective barrier and a lower protective barrier for the upper and lower surfaces of the stack of metal matrix material layers 110*a*, 110*b*, 110*c*. The ends of the stack may be exposed while the sides are partially exposed. As shown in FIG. 1A, the sides of the upper and lower casings 120*a*, 120*b* may include inwardly slanted overhangs 122*a*, 122*b* to partially protect the sides of the metal matrix material layers. The angle of these slanted overhangs 122*a*, 122*b* is generally not limited, and may be from about 5° (i.e., practically parallel with the rest of the casing 120) to about 90° (i.e., at a right angle to the rest of the casing 120). In some embodiments, the slanted overhangs 122*a*, 122*b* are at an about 45° angle.

In some embodiments, the casings 120*a* and 120*b* are attached to the metal matrix material sheets 110*a*, 110*b*, 110*c* in order to create the final seal assembly 110 and keep the separate metal matrix material sheet layers of the seal assembly 100 together. Any manner of attaching the metal matrix material sheet layers can be used. In some embodiments, the attachment is via a mechanical fastening mechanism, such as a clip or vice. In some embodiments, the attachment is via a welding, fusion, brazing or sintering process. As shown in FIG. 1A, a series of spot welds 130 are used in order to attach together the upper casing 120*a*, the metal matrix material layers 110*a*, 110*b*, 110*c* and the lower casing 120*b*.

Figure 1B:
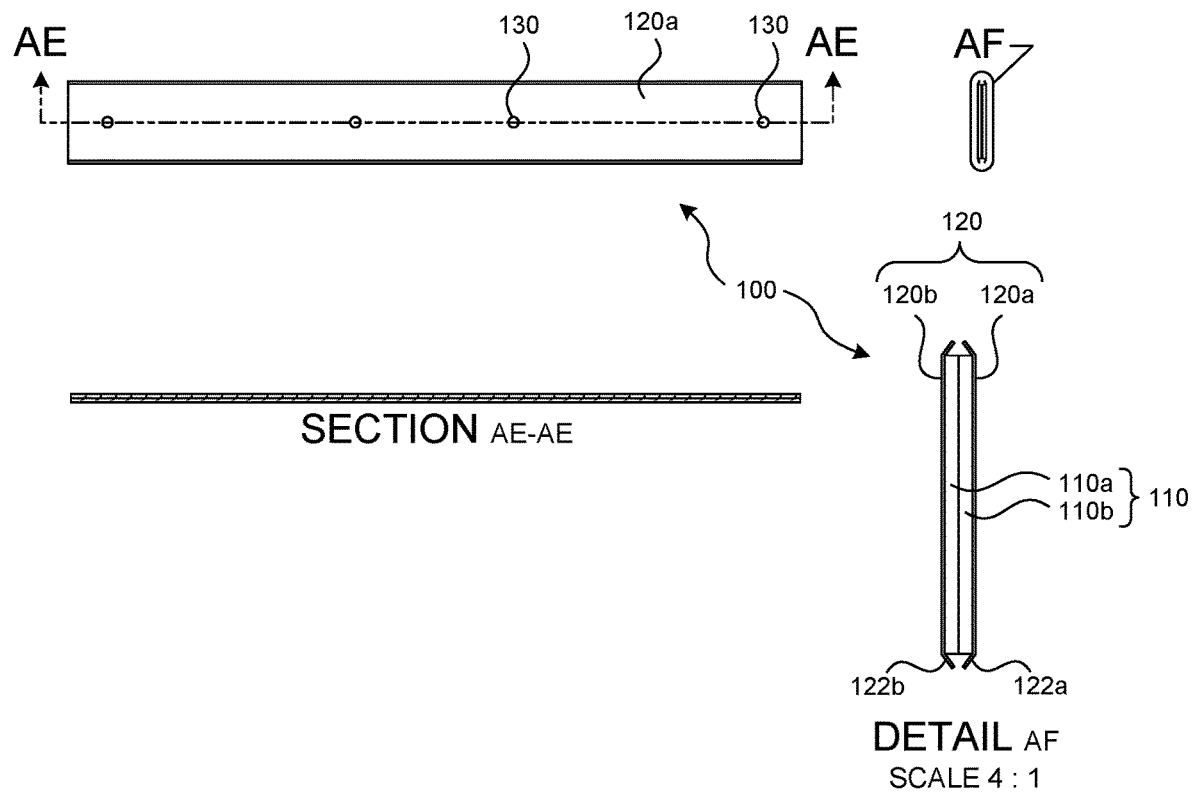

The sealing assembly 100 shown in FIG. 1B is similar to the sealing assembly 100 shown in FIG. 1A, save for the use of only two metal matrix material layers 110*a*, 110*b*. While FIGS. 1A and 1B show three layer and two layer structures, respectively, any number of metal matrix material layers can be used including one layer or more than three layers.

Figure 2:
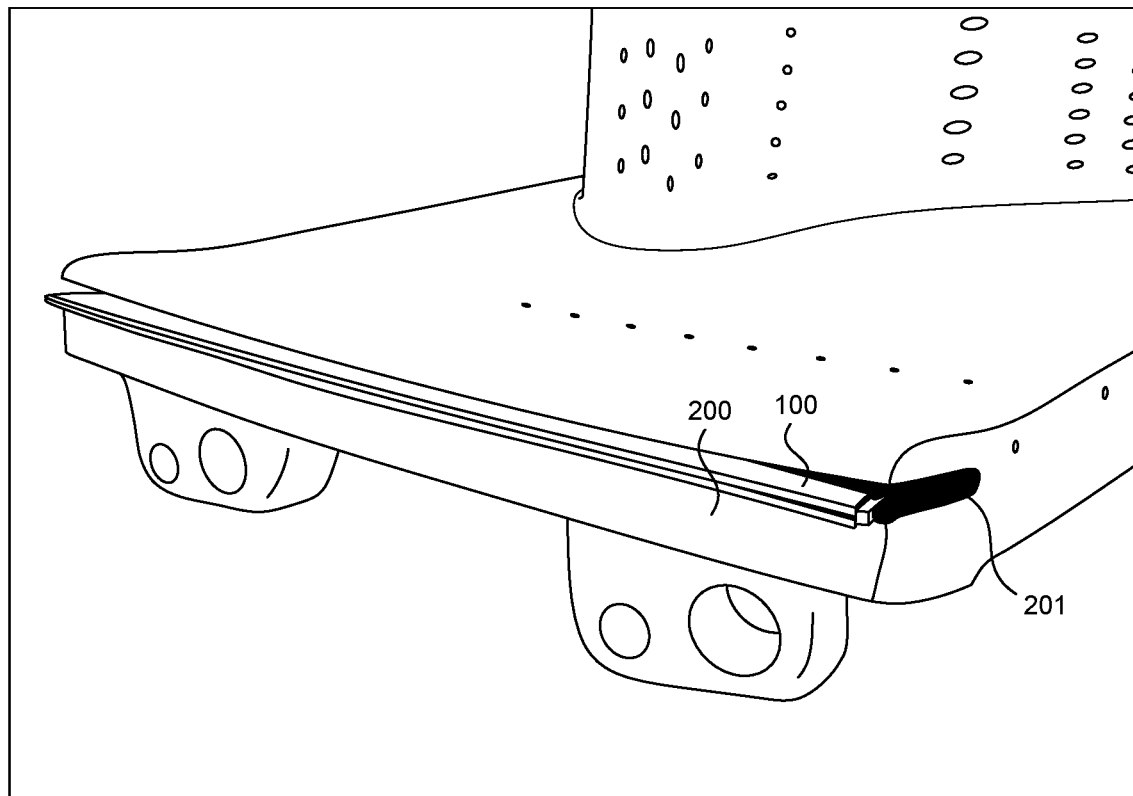
FIG. 2 illustrates a flexible seal assembly according to embodiments described herein inserted in a slot provided in a component to be sealed according to various embodiments described herein.

FIG. 2 illustrates the manner in which a seal assembly as described herein may be used in conjunction with components requiring sealing therebetween. A component of a turbine 200 is shown including a slot 201. The seal assembly 100 from, for example, FIG. 1A or 1B, can be inserted into the slot 201. A second component (not shown) to be positioned adjacent component 200 includes a similar slot that receives the other side of the seal assembly 100. In this manner, the seal assembly 100 blocks any gap that might exist or be formed between the adjacent components, which consequently improves operating performance of the, for example, turbine. The seal assembly 100 has a low torsional rigidity and high flexibility, and can therefore accommodate any movement of the components while still maintaining an effective seal and without damaging the components.

Figure 3:
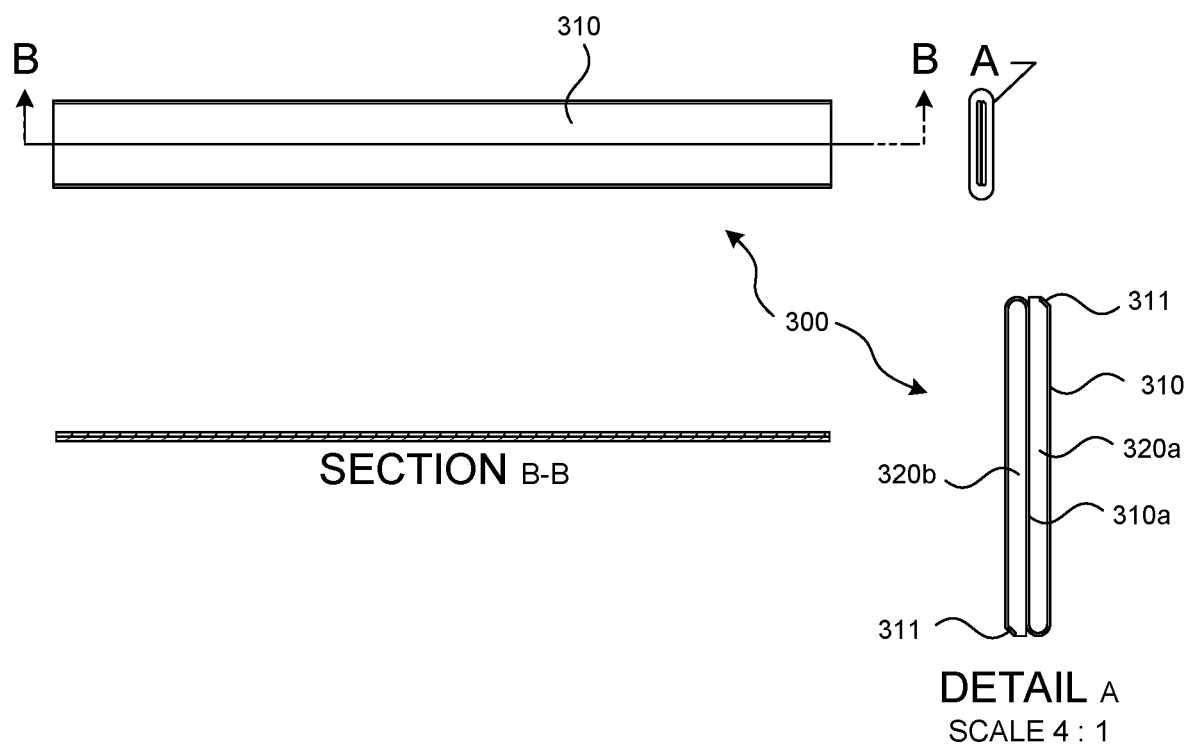
FIG. 3 illustrates top, cross-sectional and side views of a multi-layered flexible seal assembly having an S-shaped casing according to various embodiments described herein.

With reference to FIG. 3, an alternate embodiment of a seal assembly 300 is shown wherein the casing 310 is in the form of an S-shape such that an intermediate metal layer 310*a* is provided between the layers of metal matrix material 320*a*, 320*b*. The material of the metal matrix material layers 320*a*, 320*b* and the casing 310 can be similar or identical to the material described above with respect to metal matrix material layers 110*a*, 110*b*, 110*c*, and casing 120.

Each metal matrix material layer 320*a*, 320*b* is provided within either the top or bottom portion of the S-shaped casing 310 and is retained within the casing 310 by angled end portions 311 of the S-shaped casing 310. In such an embodiment, there may be no requirement for additional securement means, as the assembly stays together by virtue of the metal matrix material layers 320*a*, 320*b* being tucked within the upper and lower portion of the S-shaped casing 310 and the angled portion 311 maintaining the metal matrix material layers 320*a*, 320*b* within the upper and lower portions of the S-shaped casing.

While not required based on the self-retaining configuration of the embodiment shown in FIG. 3, the seal assembly 300 can further include means for attaching together the metal matrix layers 320*a*, 320*b* and the casing 310, such as via a mechanical fastening mechanism (e.g., a clip or vice), welding, fusion, brazing or sintering process.

Figure 4:
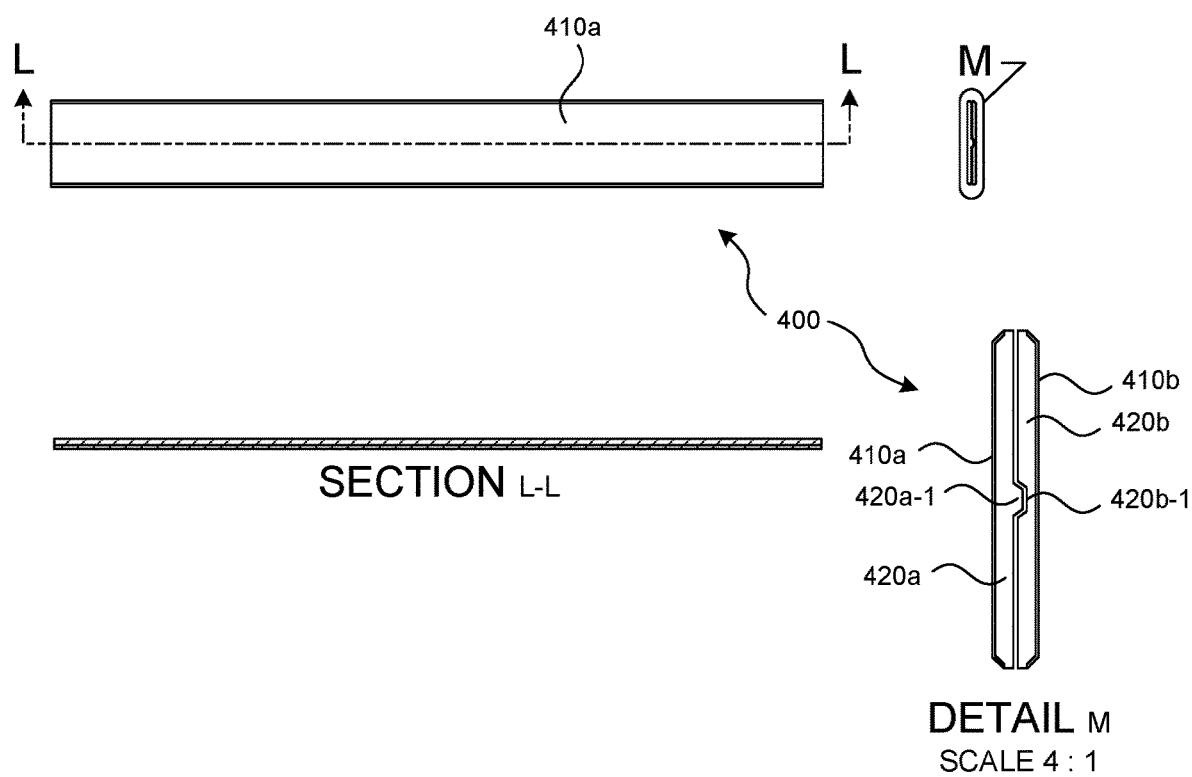
FIG. 4 illustrates top, cross-sectional and side views of a multi-layered flexible seal assembly according to various embodiments described herein.

With reference to FIG. 4, another alternate embodiment of a sealing assembly 400 is shown wherein the metal matrix material layers 420*a* and 420 are formed with a protrusion and recess, respectively, to help mechanically link the two layers together. The material of the metal matrix material layers 420*a*, 420*b* and the casing 410 can be similar or identical to the material described above with respect to metal matrix material layers 120*a*, 120*b*, 120*c*, and casing 110.

In the embodiment shown in FIG. 4, metal matrix material layer 420*a* includes a protrusion 420*a*-1, which can be made of locally accumulated segments of thin wire sintered together. Similarly, metal matrix material layer 420*b* includes a recess 420*b*-1 that is arranged and sized to receive the protrusion 420*a*-1 and thereby mechanically maintain the two layers together in at least a longitudinal direction. In other words, the protrusion 420*a*-1 and recess 420*b*-1 can prevent longitudinal sliding of the two layers away from each other. The seal assembly 400 also includes an upper casing 410a and lower casing 410b.

While not required based on the self-retaining configuration of the embodiment shown in FIG. 4, the seal assembly 400 can further include means for attaching together the metal matrix layers 420a, 420b and the casing 410, such as via a mechanical fastening mechanism (e.g., a clip or vice), welding, fusion, brazing or sintering process.

Figure 5A:
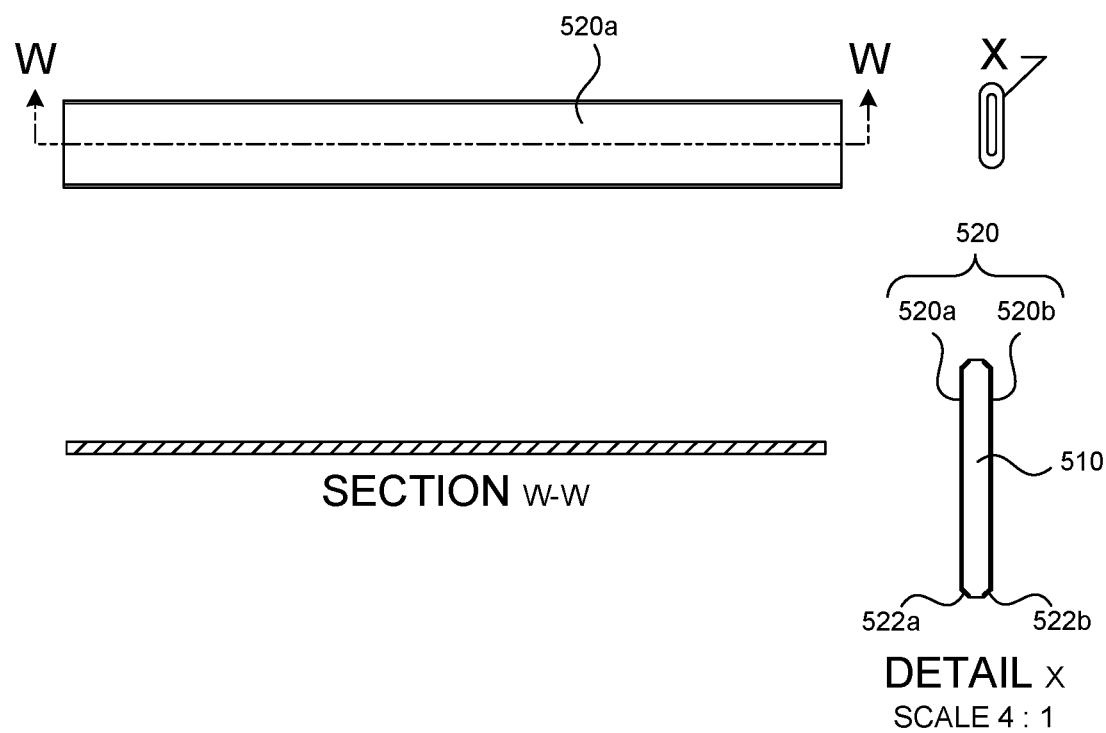
FIGS. 5A-5I illustrate top, cross-sectional and side view of various flexible seal assemblies according to various embodiments described herein.

FIG. 5A illustrates another embodiment of a seal assembly wherein the metal matrix material layer 510 is a single layer. Additionally, the upper metal casing 520a and the lower metal casing 520b of the metal casing 520 includes slanted overhangs 522a, 522b as in FIGS. 1A and 1B, but the metal matrix material layer 510 contacts the slanted overhangs 522a, 522b such that the metal matrix material layer 510 extends to the ends of the slanted overhangs 522a, 522b, rather than providing a gap between the slanted overhangs as in FIGS. 1A and 1B.

The seal assemblies shown in FIGS. 5B-5I have a similar configuration to FIG. 5A, but further include a series of slits 501 formed through the seal assembly. As described in greater detail below, the slits 501 can be vertical or angled, and can have various sizes, shapes and geometries. The various slits 501 are provided to alter the rigidity of the sealing assembly and allow for more flexibility and torsional movement such that the seal assembly is able to move with the components with which the seal assembly is used.

Figure 5B:
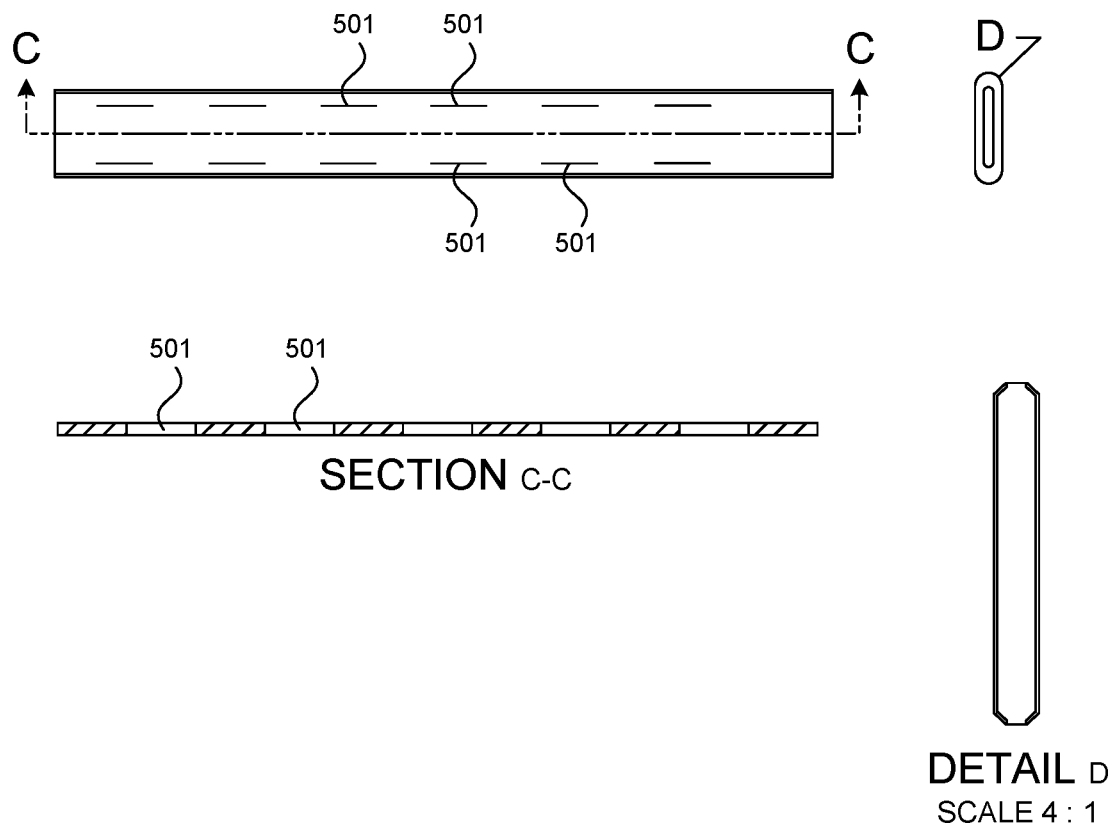

FIG. 5B shows several rows of a series of straight line slits 501 aligned in a direction parallel with the longitudinal axis of the seal assembly. The slits 501 extend vertically into the seal assembly.

Figure 5C:
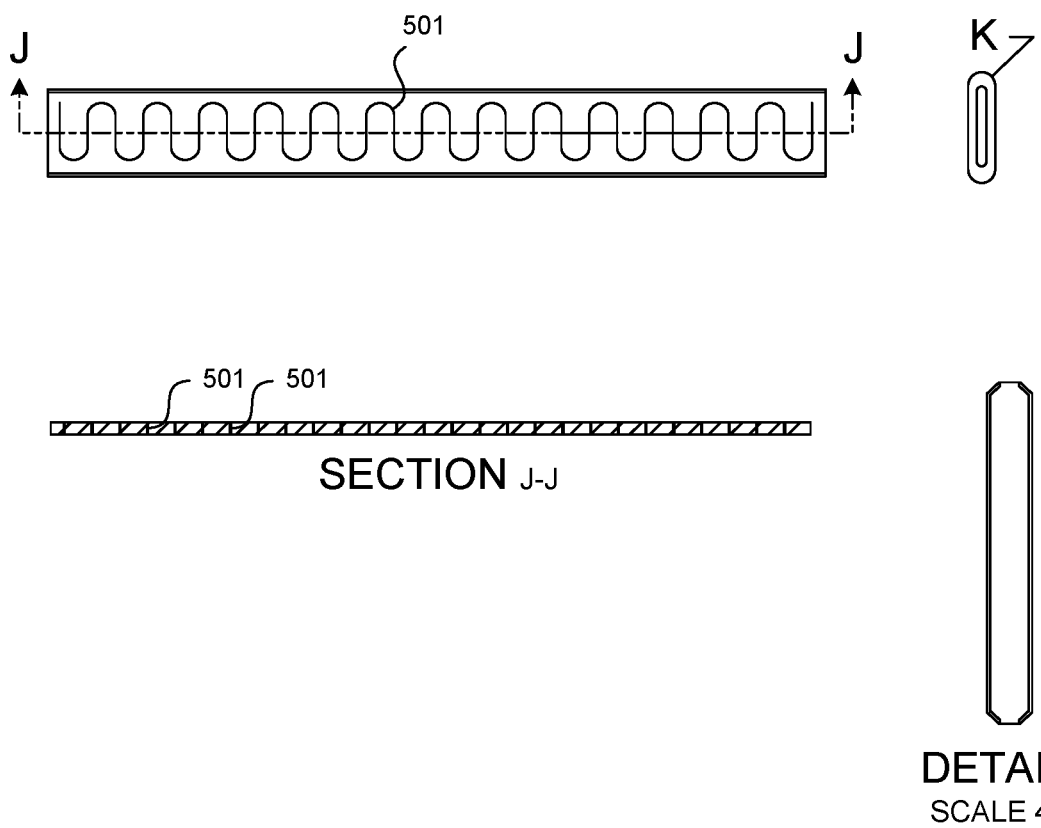

FIG. 5C shows a single continuous wave-like slit 501 formed across the length of the seal assembly. The slit 501 extends vertically into the seal assembly.

Figure 5D:
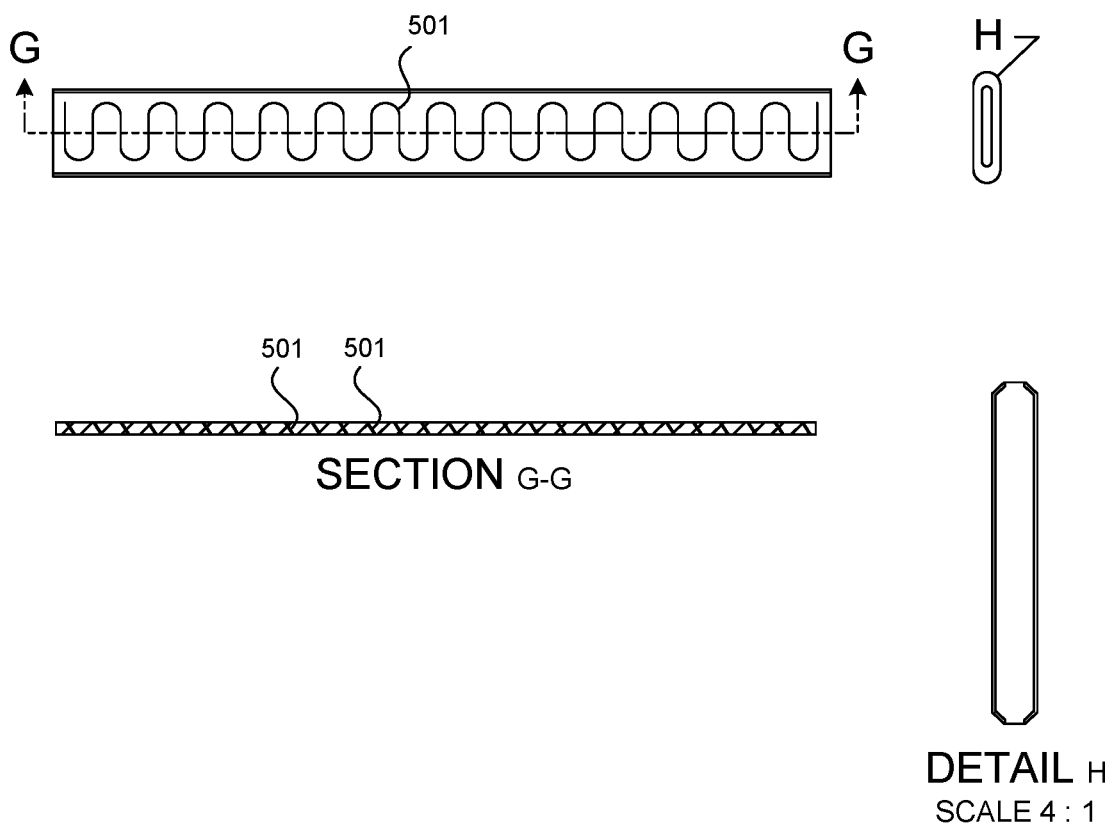

FIG. 5D is similar to FIG. 5C, but the single continuous wave-like slit 501 is formed at an angle into the seal assembly.

Figure 5E:
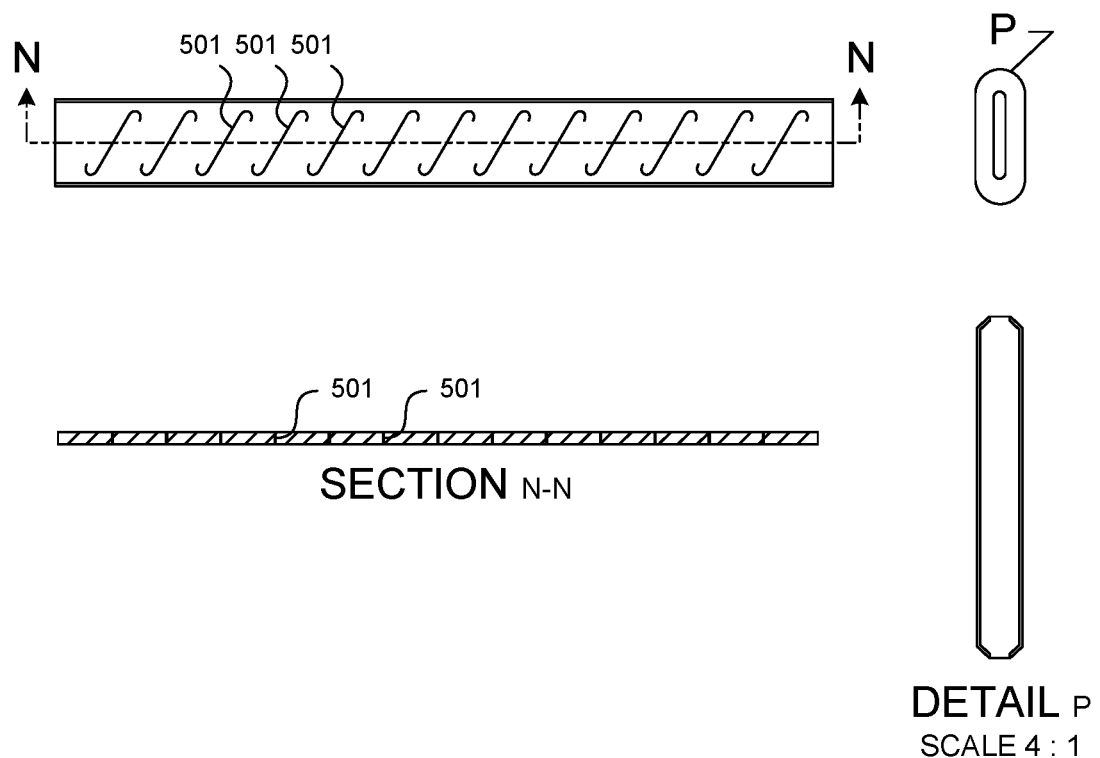

FIG. 5E shows a series of S-shaped slits 501 formed across the length of the seal assembly. The slits 501 extend vertically into the seal assembly.

Figure 5F:
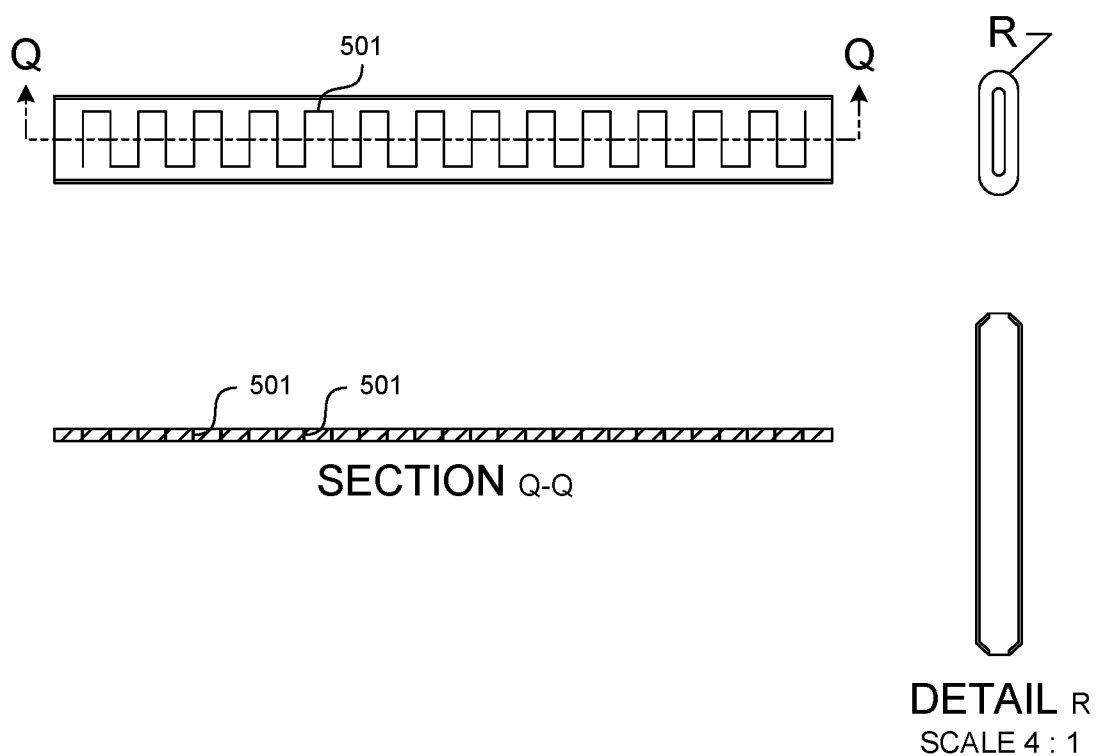

FIG. 5F shoes a single continuous right-angle wave-like slit formed across the length of the seal assembly. The slit 501 extends vertically into the seal assembly.

Figure 5G:
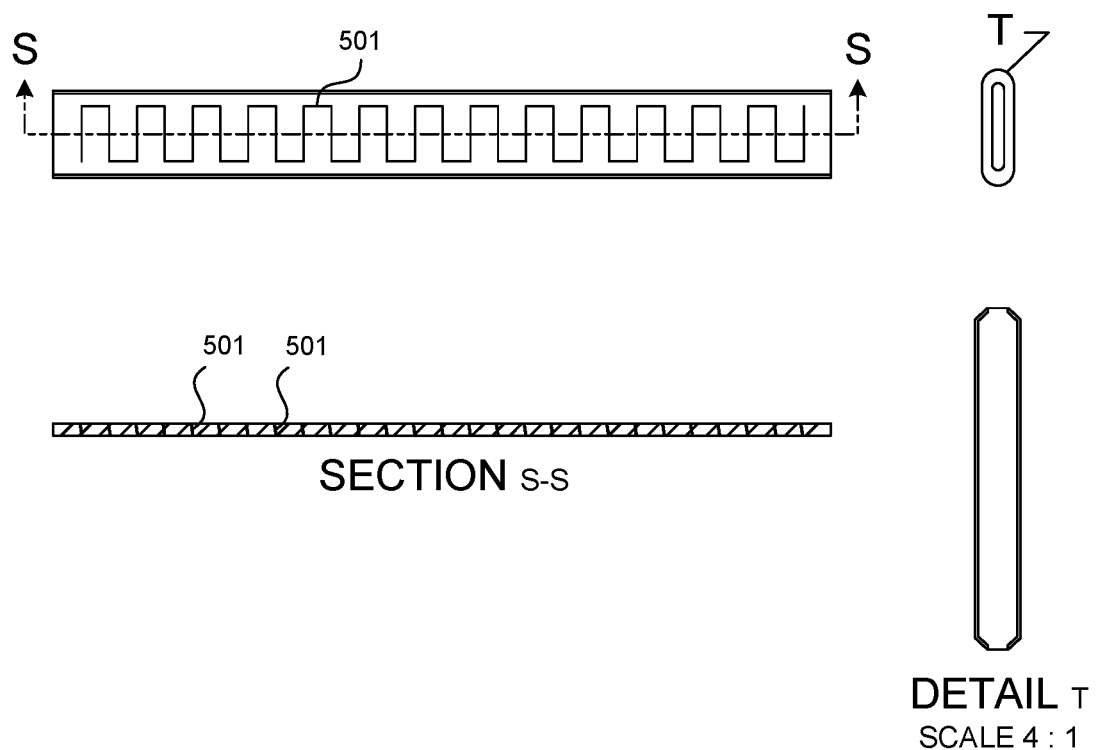

FIG. 5G is similar to FIG. 5F, but the single continuous right-angle wave-like slit 501 is formed at an angle into the seal assembly.

Figure 5H:
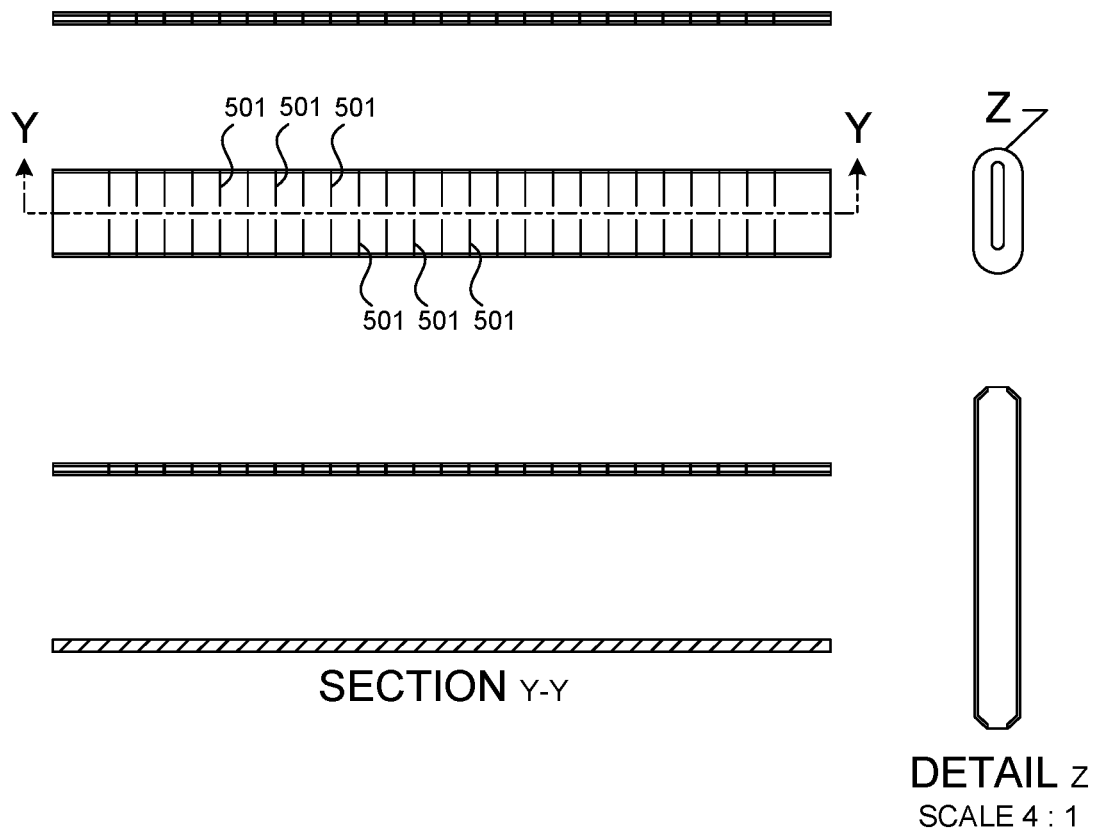

FIG. 5H shows a series of slits 501 formed in a direction perpendicular to the longitudinal axis of the seal assembly and extending towards the center of the seal assembly from both sides of the seal assembly. Each slit 501 extending from one side of the seal assembly is aligned with a corresponding slit 501 extending from the opposite side of the seal assembly. Aligned slits 501 extending from opposite sides seal assembly do not contact each other or overlap.

Figure 5I:
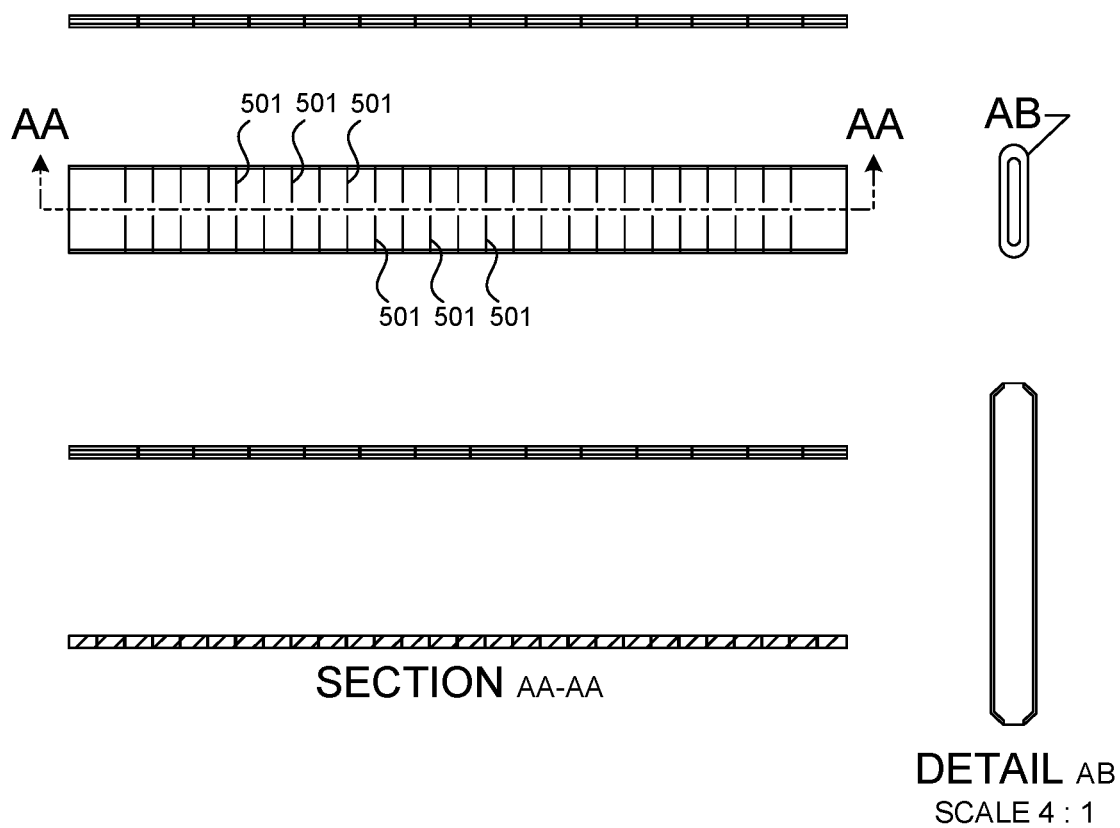

FIG. 5I shows a series of slits 501 formed in a direction perpendicular to the longitudinal axis of the seal assembly and extending towards the center of the seal assembly form both sides of the seal assembly. Each slit 501 extending from one side of the seal assembly is offset from slits 501 extending from the opposite side of the seal assembly. The slits 501 extending from opposite sides of the seal assembly overlap but do not contact each other.

While shown separately from the seal assembly embodiments of FIGS. 1-4, any of the slits configurations shown in FIGS. 5B-5I can be used in conjunction with any of the seal assembly embodiments shown in FIGS. 1-4.

From the foregoing, it will be appreciated that specific embodiments of the invention have been described herein for purposes of illustration, but that various modifications may be made without deviating from the scope of the invention. Accordingly, the invention is not limited except as by the appended claims.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended.

Unless otherwise indicated, all numbers or expressions, such as those expressing dimensions, physical characteristics, etc., used in the specification (other than the claims) are understood as modified in all instances by the term "approximately". At the very least, and not as an attempt to limit the application of the doctrine of equivalents to the claims, each numerical parameter recited in the specification or claims which is modified by the term "approximately" should at least be construed in light of the number of recited significant digits and by applying rounding techniques. Moreover, all ranges disclosed herein are to be understood to encompass and provide support for claims that recite any and all sub-ranges or any and all individual values subsumed therein. For example, a stated range of 1 to 10 should be considered to include and provide support for claims that recite any and all sub-ranges or individual values that are between and/or inclusive of the minimum value of 1 and the maximum value of 10; that is, all sub-ranges beginning with a minimum value of 1 or more or ending with a maximum value of 10 or less (e.g., 5.5 to 10, 2.34 to 3.56, and so forth) or any values from 1 to 10 (e.g., 3, 5.8, 9.9994, and so forth).

We claim:
1. A flexible seal assembly comprising:
   an S-shaped casing comprising:
     an upper casing segment;
     a middle casing segment; and
     a lower casing segment;
   a first layer of metal matrix material disposed between the upper casing segment and the middle casing segment; and
   a second layer of metal matrix material disposed between the middle casing segment and the lower casing segment.

2. The flexible seal assembly of claim 1, wherein the first layer of metal matrix material and the second layer of metal matrix material each comprise a plurality of wire segments randomly oriented and sintered together to form the layer of metal matrix material.

3. The flexible seal assembly of claim 2, wherein the aspect ratio of each of the plurality of wire segments is about 20.

4. The flexible seal assembly of claim 3, wherein the diameter of each of the plurality of wire segments is less than 0.010 inches.

5. The flexible seal assembly of claim 2, wherein the S-shaped casing comprises a metal alloy.

6. The flexible seal assembly of claim 2, wherein:
   an end of the upper casing segment includes a slanted end;
   an end of the lower casing segment includes a slanted end; and the slanted end of the upper casing segment and the lower casing segment are angled towards the middle casing segment.

7. A flexible seal assembly comprising:

a casing comprising:

an upper casing segment having a first end and a second end opposed to the first end;

a middle casing segment having a first end and a second end opposed to the first end; and a lower casing segment having a first end and a second end opposed to the first end, wherein the second end of the upper casing segment is coupled to the second end of the middle casing segment and the first end of the middle casing segment is coupled to the first end of the lower casing segment, and wherein the first end of the upper casing segment is angled and the second end of the lower casing segment is angled;

a first layer of metal matrix material disposed between the upper casing segment and the middle casing segment; and a second layer of metal matrix material disposed between the middle casing segment and the lower casing segment.

8. The flexible seal assembly of claim 7, wherein the first layer of metal matrix material and the second layer of metal matrix material each comprise a plurality of Response to Restriction Requirement dated Nov. 10, 2022 wire segments randomly oriented and sintered together to form the layer of metal matrix material.

9. The flexible seal assembly of claim 8, wherein the aspect ratio of each of the plurality of wire segments is about 20.

10. The flexible seal assembly of claim 9, wherein the diameter of each of the plurality of wire segments is less than 0.010 inches.

11. The flexible seal assembly of claim 7, wherein the casing comprises a metal alloy.

\* \* \* \* \*